United States Patent
Pratt et al.

(10) Patent No.: US 6,914,528 B2
(45) Date of Patent: Jul. 5, 2005

(54) WIRELESS COMMUNICATION SYSTEMS, RADIO FREQUENCY IDENTIFICATION DEVICES, METHODS OF ENHANCING A COMMUNICATIONS RANGE OF A RADIO FREQUENCY IDENTIFICATION DEVICE, AND WIRELESS COMMUNICATION METHODS

(75) Inventors: Richard M. Pratt, Richland, WA (US); Steven B. Thompson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/263,997

(22) Filed: Oct. 2, 2002

(65) Prior Publication Data

US 2004/0070500 A1 Apr. 15, 2004

(51) Int. Cl.[7] .............................................. G08B 13/14
(52) U.S. Cl. ..................................... 340/572.1; 340/658
(58) Field of Search .......................... 340/572.1, 572.2, 340/572.4, 572.5, 572.7

(56) References Cited

U.S. PATENT DOCUMENTS

| | | | |
|---|---|---|---|
| 4,075,632 A | * 2/1978 | Baldwin et al. | 342/51 |
| 4,352,183 A | 9/1982 | Davis et al. | 371/33 |
| 4,360,810 A | 11/1982 | Landt | 343/6.5 |
| 4,786,907 A | * 11/1988 | Koelle | 342/51 |
| 4,857,893 A | * 8/1989 | Carroll | 340/572.7 |
| 5,530,702 A | 6/1996 | Palmer et al. | 370/85.3 |
| 5,550,547 A | 8/1996 | Chan et al. | 342/42 |
| 5,606,323 A | * 2/1997 | Heinrich et al. | 340/10.34 |
| 5,731,691 A | * 3/1998 | Noto | 323/220 |
| 5,850,181 A | * 12/1998 | Heinrich et al. | 340/572.1 |
| 5,850,187 A | 12/1998 | Carrender et al. | 340/10.6 |
| 5,883,368 A | * 3/1999 | Jeong | 219/761 |
| 5,883,582 A | 3/1999 | Bowers et al. | 340/825.54 |
| 5,986,570 A | 11/1999 | Black et al. | 340/825.54 |
| 6,054,925 A | * 4/2000 | Proctor et al. | 340/572.7 |

(Continued)

OTHER PUBLICATIONS

U.S. Appl. No. 09/589,001, filed Jun. 6, 2000, Gilbert et al.
U.S. Appl. No. 09/802,408, filed Mar. 9, 2001, Gilbert et al.

(Continued)

*Primary Examiner*—Daniel Wu
*Assistant Examiner*—Son Tang
(74) *Attorney, Agent, or Firm*—Wells St. John, P.S.

(57) ABSTRACT

Wireless communication systems, radio frequency identification devices, methods of enhancing a communications range of a radio frequency identification device, and wireless communication methods are described. According to one aspect, a wireless communication system includes a reader configured to output a first wireless communication signal and to receive a second wireless communication signal comprising a backscatter signal and a remote communication device configured to receive the first wireless communication signal and to communicate the second wireless communication signal comprising the backscatter signal, wherein the remote communication device includes an antenna configured to provide electrical energy, communication circuitry configured to process the received first wireless communication signal and to generate a modulation signal to communicate the backscatter signal and a plurality of power conditioning circuits coupled in series intermediate the antenna and the communication circuitry and individually configured to enhance at least one electrical characteristic of the electrical energy from the antenna.

20 Claims, 2 Drawing Sheets

U.S. PATENT DOCUMENTS

| | | | | |
|---|---|---|---|---|
| 6,091,319 | A | | 7/2000 | Black et al. ............... 340/10.2 |
| 6,130,623 | A | | 10/2000 | MacLellan et al. ..... 340/825.54 |
| 6,140,924 | A | * | 10/2000 | Chia et al. ............... 340/572.5 |
| 6,177,861 | B1 | | 1/2001 | MacLellan et al. ........ 340/10.1 |
| 6,202,927 | B1 | * | 3/2001 | Bashan et al. .............. 235/451 |
| 6,243,013 | B1 | | 6/2001 | Duan et al. ............. 340/572.7 |
| 6,265,962 | B1 | | 7/2001 | Black et al. ............... 340/10.2 |
| 6,307,848 | B1 | | 10/2001 | Wood, Jr. ................... 370/329 |
| 6,366,260 | B1 | | 4/2002 | Carrender .................. 343/866 |
| 6,400,274 | B1 | * | 6/2002 | Duan et al. ............. 340/572.7 |
| 6,515,919 | B1 | * | 2/2003 | Lee ............................ 365/192 |
| 6,590,498 | B2 | * | 7/2003 | Helms ..................... 340/572.7 |
| 6,615,074 | B2 | * | 9/2003 | Mickle et al. .............. 600/509 |
| 6,738,025 | B2 | * | 5/2004 | Carrender .................. 343/860 |

OTHER PUBLICATIONS

U.S. Appl. No. 09/833,465, filed Apr. 11, 2001, Carrender et al.
U.S. Appl. No. 09/588,997, filed Jun. 6, 2000, Gilbert et al.
U.S. Appl. No. 09/589,000, filed Jun. 6, 2000, Gilbert et al.
U.S. Appl. No. 09/588,998, filed Jun. 6, 2000, Carrender et al.
U.S. Appl. No. 09/797,539, filed Feb. 28, 2001, Carrender.
U.S. Appl. No. 09/833,391, filed Apr. 11, 2001, Carrender.
Finkenzeller, Klaus, "Radio–Frequency identification Fundamentals and Applications", *RFID Handbook*, Chapter 8, pp. 151–158 (Jan. 2002).
International Standard, ISO/IEC, "Part 2: Mechanisms Using Symmetry Encipherment Algorithms", *Information Technology—Security Techniques—Entity Authentication*, #ISO/IEC 9798–2:1999(E), 2nd Ed., pp 1–11 (Jul. 15, 1999).
Agilent Technologies, "Schottky Diode Voltage Doubler, Application Note 956–4", 2 pages (1999).
U.S. Patent Appn. filed Oct. 2, 2002, entitled "RFID System and Method Including Tag ID Compression", Michael A. Hughes and Richard M. Pratt.

U.S. Patent Appn. filed Oct. 2, 2002, entitled "Radio Frequency Identification Device Communications Systems, Wireless Communication Devices, Wireless Communication Systems, Backscatter Communication Methods, Radio Frequency Identification Device Communication Methods and a Radio Frequency Identification Device", by Michael A. Hughes and Richard M. Pratt.
U.S. Patent Appn. filed Oct. 2, 2002, entitled "Wireless Communications Devices, Methods of Processing a Wireless Communication Signal, Wireless Communication Synchronization Methods and a Radio Frequency Identification Device Communication Method", by Richard M. Pratt and Steven B. Thompson.
U.S. Patent Appn. filed Oct. 2, 2002, entitled "Wireless Communications Systems, Radio Frequency Identification Devices, Wireless Communications Methods, and Radio Frequency Identification Device Communications Methods", by Richard M. Pratt and Steven B. Thompson.
U.S. Patent Appn. filed Oct. 2, 2002, entitled "A Challenge–Based Tag Authentication Model", by Michael A. Hughes and Richard M. Pratt.
U.S. Patent Appn. filed Oct. 2, 2002, entitled "Method of Simultaneously Reading Multiple Radio Frequency Tags, RF Tag, and RF Reader", by Emre Ertin, Richard M. Pratt, Michael A. Hughes, Kevin L. Priddy and Wayne M. Lechelt.
U.S. Patent Appn. filed Oct. 2, 2002, entitled "Radio Frequency Identification Devices, Backscatter Communication Device Wake–Up Methods, Communication Device Wake–Up Methods and a Radio Frequency Identification Device Wake–Up Method", by Richard M. Pratt and Michael A. Hughes.
U.S. Patent Appn. filed Oct. 2, 2002, entitled "System and Method to Identify Multiple RFID Tags", by Michael A. Hughes and Richard M. Pratt.

* cited by examiner

WIRELESS COMMUNICATION SYSTEMS, RADIO FREQUENCY IDENTIFICATION DEVICES, METHODS OF ENHANCING A COMMUNICATIONS RANGE OF A RADIO FREQUENCY IDENTIFICATION DEVICE, AND WIRELESS COMMUNICATION METHODS

TECHNICAL FIELD

The present invention relates to wireless communication systems, radio frequency identification devices, methods of enhancing a communications range of a radio frequency identification device, and wireless communication methods.

BACKGROUND OF THE INVENTION

Remote wireless communications may be implemented using radio frequency (RF) technology. Exemplary applications utilizing RF technology include identification applications including, for example, locating, identifying, and tracking of objects. Radio frequency identification device (RFID) systems may be utilized to facilitate identification operations. For example, one device may be arranged to output and receive radio frequency communications and one or more remotely located device may be configured to communicate with the one device using radio frequency communications. The remotely located device(s) may be referred to as a tag, while the other device may be referred to as a reader. Some advantages of radio frequency communications of exemplary radio frequency identification device systems include an ability to communicate without contact or line-of-sight, at relatively fast speeds, and with robust communication channels.

A communications range for reading passive and semi-passive radio frequency identification devices may be limited by circuitry that uses interrogation beam power to detect the presence of interrogation signals. Aspects of the present invention including methodologies and structural arrangements provide robust wireless communications to enhance communications between remotely located wireless communication devices.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Attention is directed to the following commonly assigned applications, which are incorporated herein by reference:

U.S. patent application Ser. No. 10/263,826 entitled "Radio Frequency Identification Device Communications Systems, Wireless Communication Devices, Backscatter Communication Methods, Radio Frequency Identification Device Communication Methods, and a Radio Frequency Identification Device," by inventors Mike A. Hughes and Richard M. Pratt; U.S. patent application Ser. No. 10/263,809, entitled "Method of Simultaneously Reading Multiple Radio Frequency Tags, RF Tag, and RF Reader," by inventors Emre Ertin, Richard M. Pratt, Mike A. Hughes, Kevin L. Priddy, and Wayne M. Lechelt; U.S. patent application Ser. No. 10/263,873, entitled "RFID System and Method Including Tag ID Compression," by inventors Richard M. Pratt and Mike A. Hughes; U.S. patent application Ser. No. 10/264,078, entitled "System and Method to Identify Multiple RF Tags," by inventors Mike A. Hughes and Richard M. Pratt; U.S. patent application Ser. No. 10/263,940, entitled "Radio Frequency Identification Devices, Backscatter Communication Device Wake-up Methods, Communication Device Wake-up Methods and A Radio Frequency Identification Device Wake-up Method," by inventors Richard Pratt and Mike Hughes; U.S. patent application Ser. No. 10/263,670, entitled "Wireless Communications Devices, Methods of Processing a Wireless Communication Signal, Wireless Communication Synchronization Methods and a Radio Frequency Identification Device Communication Method," by inventors Richard M. Pratt and Steven B. Thompson; U.S. patent application Ser. No. 10/263,656, entitled "Wireless Communications Systems, Radio Frequency Identification Devices, Wireless Communications Methods, and Radio Frequency Identification Device Communications Methods," by inventors Richard Pratt and Steven B. Thompson; U.S. patent application Ser. No. 10/263,635, entitled "A Challenged-Based Tag Authentication Model," by inventors Mike A. Hughes and Richard M. Pratt; U.S. patent application Ser. No. 09/589,001, filed Jun. 6, 2000, entitled "Remote Communication System and Method," by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System," by inventors R. W. Gilbert, G. A. Anderson, and K. D. Steele; U.S. patent application Ser. No. 09/833,465, filed Apr. 11, 2001, entitled "System and Method for Controlling Remote Device," by inventors C. L. Carrender, R. W. Gilbert, J. W. Scott, and D. Clark; U.S. patent application Ser. No. 09/588,997, filed Jun. 6, 2000, entitled "Phase Modulation in RF Tag," by inventors R. W. Gilbert and C. L. Carrender; U.S. patent application Ser. No. 09/589,000, filed Jun. 6, 2000, entitled "Multi-Frequency Communication System and Method," by inventors R. W. Gilbert and C. L. Carrender; U.S. patent application Ser. No. 09/588,998; filed Jun. 6, 2000, entitled "Distance/Ranging by Determination of RF Phase Delta," by inventor C. L. Carrender; U.S. patent application Ser. No. 09/797,539, filed Feb. 28, 2001, entitled "Antenna Matching Circuit," by inventor C. L. Carrender; U.S. patent application Ser. No. 09/833,391, filed Apr. 11, 2001, entitled "Frequency Hopping RFID Reader," by inventor C. L. Carrender.

According to one aspect, a wireless communication system comprises a reader configured to output a first wireless communication signal and to receive a second wireless communication signal comprising a backscatter signal and a remote communication device configured to receive the first wireless communication signal and to communicate the second wireless communication signal comprising the backscatter signal, wherein the remote communication device comprises an antenna configured to provide electrical energy, communication circuitry configured to process the received first wireless communication signal and to generate a modulation signal to communicate the backscatter signal and a plurality of power conditioning circuits coupled in series intermediate the antenna and the communication circuitry and individually configured to enhance at least one electrical characteristic of the electrical energy from the antenna.

According to another aspect, a radio frequency identification device comprises an antenna configured to provide electrical energy corresponding to received electromagnetic energy comprising a first wireless communication signal from a reader, a plurality of voltage doubler circuits individually configured to increase a voltage of the electrical energy from the antenna and communication circuitry coupled with the voltage doubler circuits and configured to receive the electrical energy of the increased voltage from the voltage doubler circuits, wherein the communication circuitry is configured to process the electrical energy of the increased voltage to process the first wireless communication signal.

According to an additional aspect, a method of enhancing a communications range of a radio frequency identification device comprises providing a radio frequency identification device including a first voltage doubler circuit and a second voltage doubler circuit, receiving electromagnetic energy using an antenna of the radio frequency identification device, providing electrical energy of a first voltage using the antenna of the radio frequency identification device and responsive to the received electromagnetic energy, increasing a voltage of the electrical energy to a second voltage greater than the first voltage using the first voltage doubler circuit, increasing the voltage of the electrical energy to a third voltage greater than the second voltage using the second voltage doubler circuit coupled in series with the first voltage doubler circuit and implementing radio frequency identification device communications using the radio frequency identification device and the electrical energy of the third voltage.

Yet another aspect provides a wireless communication method comprising providing a first device and a second device individually configured to communicate wireless communication signals, outputting a first wireless communication signal using the first device, first increasing an electrical characteristic of the first wireless communication signal using a first power conditioning circuit of the second device, second increasing the electrical characteristic of the first wireless communication signal using a second power conditioning circuit of the second device after the first increasing, processing the first wireless communication signal using the second device after the first and second increasings and backscatter modulating radio frequency energy using the second device responsive to the processing and to communicate a second wireless communication signal to the first device.

Figure 1:
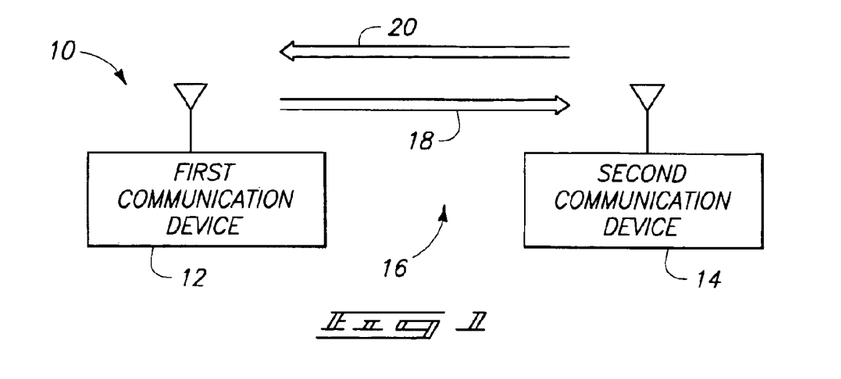
FIG. 1 is a functional block diagram of an exemplary wireless communication system.

Referring to FIG. 1, an exemplary wireless communication system 10 is depicted. The exemplary system 10 includes a first communication device 12 and one or more second communication device 14. Only one device 14 is shown in the exemplary arrangement of FIG. 1. In other applications, a plurality of devices 14 may be utilized for communications.

First and second communication devices 12, 14 are arranged to implement wireless communications 16 in the depicted exemplary embodiment. Possible wireless communications 16 include first wireless communication signals 18 communicated from first communication device 12 and second wireless communication signals 20 communicated from the one or more second communication device 14. Wireless communication signals include signals (e.g., electromagnetic) which at some point in time are communicated over a wireless medium but may also be communicated over an electrical conductor (e.g., electrical signals within devices 12, 14) at other moments in time.

System 10 is provided to illustrate exemplary structural and method aspects of the present invention. In one possible implementation, system 10 is implemented as a radio frequency identification device (RFID) communications system. For example, in such an arrangement, first communication device 12 may be implemented as a reader, and second communication devices 14 may be referred to as remote communication devices and may be implemented as transponders, such as RFID tags. In such an implementation, devices 14 may be associated with respective articles to implement identification operations.

In one configuration, first wireless communication signals 18 may be referred to as forward link wireless signals and second wireless communication signals 20 may be referred to as return link wireless signals communicated responsive to forward link wireless signals 18. Exemplary wireless communications 16 include electromagnetic energy or signals, such as radio frequency signals. Alternatively, wireless communications 16 may comprise infrared signals, acoustic signals, or any other appropriate signals capable of being communicated between devices 12, 14.

Figure 2:
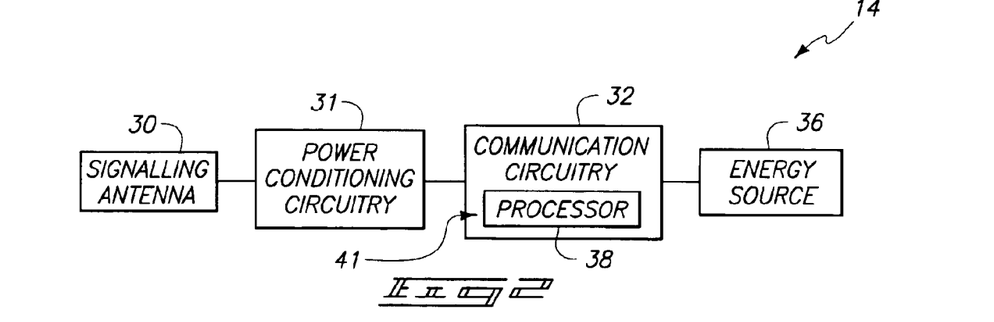
FIG. 2 is a functional block diagram of components of an exemplary configuration of a wireless communication device of the system.
Figure 3:
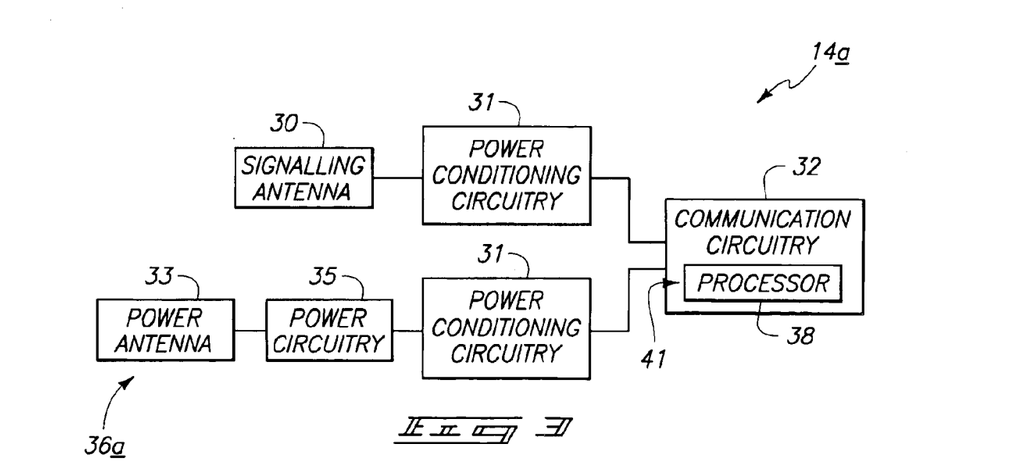
FIG. 3 is a functional block diagram of components of another possible exemplary arrangement of the wireless communication device shown in FIG. 2.

Referring to FIG. 2, an exemplary arrangement of communication device 14 comprising a semi-passive device is shown. Another possible exemplary arrangement of the second communication device 14 configured as a passive device is illustrated in FIG. 3 with respect to reference numeral 14a. Like references herein may refer to like components with any significant differences therebetween being represented by a suffix, such as "a".

Referring again to FIG. 2, the exemplary configuration of device 14 includes a signaling antenna 30, power conditioning circuitry 31, communication circuitry 32, and an energy source 36.

Signaling antenna 30 is arranged to receive electromagnetic energy of signals 18 and to output electromagnetic energy of signals 20. Signaling antenna 30 may comprise a single antenna for communication of signals 18, 20, or include a plurality of respective dedicated antennas for communication of signals 18, 20.

Power conditioning circuitry 31 operates to provide device 14 having increased sensitivity according to aspects of the present invention. Power conditioning circuitry 31 operates to increase a communications range of system 10 for a given transmission power, or to enable communications of a common communications range at a reduced transmission power.

As is discussed in detail below, power conditioning circuitry 31 is arranged to increase an electrical characteristic of electrical energy corresponding to received electromagnetic energy to increase the sensitivity of detection circuitry of device 14. Exemplary detection circuitry including a comparator is discussed in a U.S. patent application entitled "Radio Frequency Identification Devices, Backscatter Communication Device Wake-up Methods, Communication Device Wake-up Methods and A Radio Frequency Identification Device Wake-up Method," naming Richard Pratt and Mike Hughes as inventors, having Ser. No. 10/263,940, filed the same day as the present application, and incorporated herein by reference.

Communication circuitry 32 includes processing circuitry 41 according to at least one configuration. Processing circuitry 41 is arranged to control operations of device 14 including processing received signals and formulating outputted signals. Exemplary processing circuitry 41 may include a processor 38 such as a model number MSP430F1121 available from Texas Instruments, Inc. Other processor configurations or processing circuitry configurations (e.g., embedded circuitry) are possible.

Energy source 36 may comprise one of a plurality of possible configurations corresponding to the implementation of communication device 14. In semi-passive implementations, such as the arrangement of FIG. 2, energy source 36 may be implemented as a battery utilized to provide operational energy (e.g., electrical energy) to communication circuitry 32 to implement processing of wireless signals 18. Electromagnetic energy received within device 14 is utilized to generate wireless signals 20 in one arrangement. As discussed below with reference to FIG. 3 for passive implementations of device 14*a*, received electromagnetic energy is utilized to provide operational energy to components of device 14*a* as well as to communicate wireless signals 20.

Processor 38 of communication circuitry 32 is configured to execute instructions to control communication operations of device 14. For example, processor 38 of communication circuitry 32 is arranged to process received wireless communication signals 18 and to control communication of outputted wireless communication signals 20. In one arrangement, processor 38 is configured to control antenna 30 to generate wireless communication signals 20 using backscatter modulation communication techniques. Communication circuitry 32 may control outputting of wireless communication signals 20 using backscatter modulation according to at least one radio frequency identification device communications protocol. In such an arrangement, wireless communication signals 20 are generated by backscatter modulating electromagnetic energy present at device 14. The electromagnetic energy which is backscatter modulated may be generated by device 12 (e.g., a continuous wave signal outputted from device 12, communications from device 12 to other devices 14, etc.) or by other sources.

Communication circuitry 32 controls electrical characteristics of antenna 30 according to one backscatter embodiment. Processor 38 may provide a modulation signal to alter electrical characteristics of antenna 30 wherein electromagnetic energy is selectively reflected by antenna 30. Antenna 30 selectively reflects electromagnetic energy creating wireless communication signals 20 responsive to the modulation signal according to one exemplary backscatter implementation.

The modulation signal may be encoded with information to be communicated from device 14 to device 12. Exemplary information includes identification information, such as a unique serial number which identifies the communicating device 14, or any other desired information to be communicated. According to one exemplary arrangement, communication devices 12, 14 are configured to communicate wireless signals 18, 20 using on/off key (OOK) modulation, such as a FM0 or FM1 encoding scheme. Other types of modulation or schemes may be utilized to communicate information between devices 12, 14.

Communication circuitry 32 arranged to implement RFID communications may be referred to as radio frequency identification device communication circuitry. Communication circuitry 32 may be operable to control communication of wireless signals 20 responsive to processing of one or more wireless signal 18. For example, circuitry 32 may implement transponder communications in one exemplary embodiment.

Processing of received signals 18 may include extracting an identifier from the wireless signals 18 (e.g., an identifier of the communicating device 12 and\or identifying device 14) and also include processing of commands within signals 18. Responsive to processing, device 14 may selectively output or communicate wireless signals 20 including identification information or other desired requested information from first communication device 12.

Referring to FIG. 3, an exemplary passive configuration of a communication device is described with respect to reference 14*a*. As illustrated, the depicted communication device 14*a* includes signaling antenna 30, power conditioning circuitry 31 coupled with antenna 30, and communication circuitry 32.

In addition, device 14*a* includes an energy source 36*a* configured to derive operational energy from received electromagnetic energy. The exemplary energy source 36*a* of FIG. 3 includes a power antenna 33, power circuitry 35, and power conditioning circuitry 31 configured to provide operational energy to communication circuitry 32 including processor 38.

Power antenna 33 is arranged and tuned to receive electromagnetic energy and to provide electrical energy. For example, power antenna 33 may be tuned to a communication frequency of device 12 in implementations wherein device 14 is to provide electrical energy from communications of device 12 (e.g., 2.45 GHz continuous wave signal).

Power circuitry 35 is arranged to provide operational energy from electrical energy provided by antenna 33. Exemplary configurations of power circuitry 35 are described as power section circuitry in a U.S. patent application Ser. No. 09/797,539, entitled "Antenna Matching Circuit," having docket number 12630-B; and as a power circuit in a U.S. patent application Ser. No. 09/589,001, entitled "Remote Communication System and Method," having docket number E-1674, the teachings of both applications are incorporated herein by reference. Other configurations of power circuitry 35 are possible.

In one aspect, power conditioning circuitry 31 is operable to increase or enhance an electrical characteristic of operational energy from power circuitry 35 prior to utilization within communication circuitry 32 and processor 38. Further details of exemplary circuitry 31 coupled with power circuitry 35 are discussed in detail below.

Some other passive implementations of device 14*a* may utilize a single antenna for receiving electromagnetic energy corresponding to first wireless communication signals 18 and also for providing operational energy. For example, antenna 33 could be omitted and antenna 30 could be coupled with power circuitry shown in FIG. 3.

Aspects of the invention for increasing sensitivity of detection circuitry of device 14 are described below. Increasing the sensitivity provides a greater communications range for a given transmission power, or enables communications within a given communications range using less transmission power depending upon the particular desired application.

A transmitter of device 12 radiates energy using a transmit antenna in radio frequency implementations. This energy radiates at the speed of light from the antenna outward in all directions. At any distance from device 12, the energy per square unit is equal to the radiated energy (times the antenna gain) divided over the surface area of a sphere, which has a radius equal to the range at which the density is being measured. In mathematical terms:

$$\text{Energy density (W/m}^2) = \frac{\text{Transmitted energy} * \text{Antenna gain}}{4\pi * \text{range (m)} * \text{range (m)}} \quad (1)$$

Only a portion of the transmitted energy reaches device 14, 14a for conversion into electrical energy. A term called effective aperture makes this efficiency conversion. In mathematical terms such may be represented as:

$P_r$=Energy received (W)=Energy density at range
    (W/m$^2$)*Effective aperture (m$^2$) (2)

The appropriate antenna(s) of device 14, 14a collects this energy which may be rectified to produce operational energy (e.g., operating voltage) and/or communication signals for passive devices 14a, or communication signals for semi-passive devices 14. The effective aperture of device 14, 14a is a function of the gain of the antenna and the square of the operating wavelength (speed of light/operating frequency). The operating wavelength defines the antenna length.

The actual antenna gains and cable losses are considered when calculating the signal power $P_r$ available at the receiver input of communication circuitry 32:

$$P_r = P_t - L_t + G_t - L_p + G_r - L_r \quad (3)$$

where $P_t$=transmitter power output (dBm or dBW, same units as $P_r$)

$L_p$=free space path loss between isotropic antennas (dB)
$G_t$=transmit antenna gain (dBi)
$G_r$=receive antenna gain (dBi)
$L_t$=transmission line loss between transmitter and transmit antenna (dB)
$L_r$=transmission line loss between receive antenna and receiver input (dB)

When the sensitivity of device 14, 14a is increased, the device requires less power to detect an input signal. Since all the other factors remain constant, free space path loss between antennas $L_p$, can decrease if sensitivity is increased. If the sensitivity is increased by 12 dBv (6 dBm—referenced to 1 mW), then a 100% range improvement is obtained as shown in Equations (4) and (5).

$$L_p = \text{Path Loss (dBm)} = 32.4 + 20*\log(f) + 20*\log(d) \quad (4)$$

$$L_p = \text{Path Loss (dBm)} = 6 \text{ dBm} = 20*\log(d) \quad (5)$$

where f is frequency in MHz and d is distance in kilometers.

Aspects of the present invention provide exemplary methods and structures for implementing improvements in a communications range of system 10 or, put another way, enabling communications of a common communications range with reduced transmission power. According to one aspect, sensitivity of devices 14, 14a is increased using power conditioning circuitry 31.

Power conditioning circuitry 31 is arranged to enhance or increase at least one electrical characteristic of electrical energy from a respective antenna 30, 33 corresponding to received electromagnetic energy according to at least one aspect. As discussed further below, exemplary power conditioning circuitry 31 comprises a plurality of power conditioning circuits (e.g., reference 39 in FIG. 4) coupled in series and individually configured to increase the at least one electrical characteristic of the electrical energy. In one aspect, the power conditioning circuits are individually configured to increase the voltage of the electrical energy. Power conditioning circuitry 31 may include at least two circuits 39 and perhaps more depending upon the particular application or implementation of system 10.

Accordingly, for configurations wherein circuitry 31 is coupled with signaling antenna 30, circuitry 31 is arranged to increase an electrical characteristic of electrical energy corresponding to received first wireless communication signals 18. For passive configurations, circuitry 31 may increase an electrical characteristic of operational energy used within device 14a.

Figure 4:
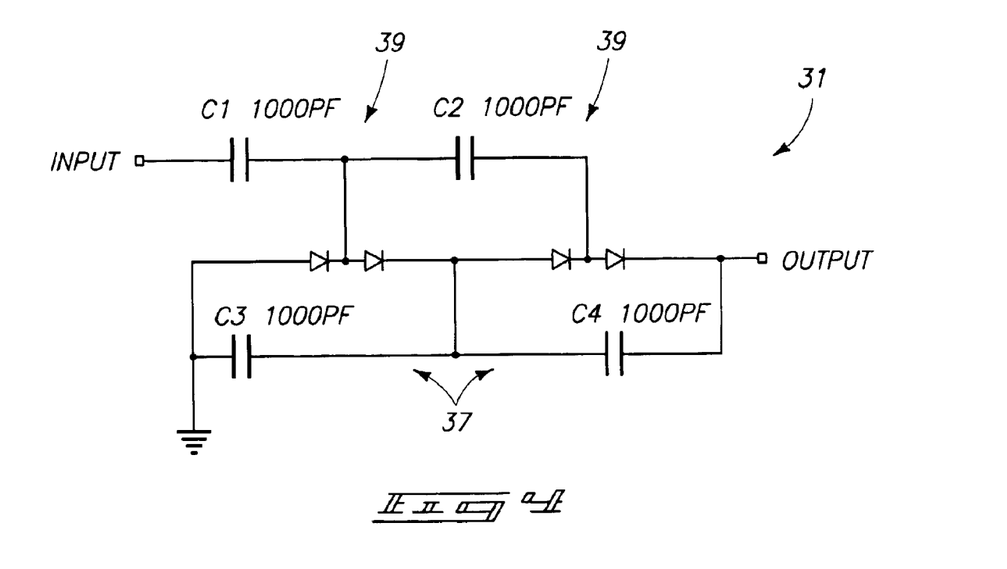
FIG. 4 is a schematic representation of exemplary power conditioning circuitry of the devices of FIGS. 2 and 3.

The power conditioning circuits 39 coupled in series within circuitry 31 are individually implemented as a voltage doubler circuit in one implementation. Referring to FIG. 4, exemplary configurations of power conditioning circuits 39 implemented as voltage doubler circuits 37 are shown. The voltage doubler circuits 37 may comprise full-wave rectifier circuit arrangements as shown in the exemplary embodiment depicted in FIG. 4. Other configurations of power conditioning circuits 39 are possible.

The depicted input of circuitry 31 of FIG. 4 may be coupled with signaling antenna 30 for conditioning of received signals 18, or with power antenna 33 for conditioning of electrical energy utilized as operational energy for device 14a. The output of circuitry 31 coupled with an antenna 30 may be coupled with detection circuitry comprising, for example, a comparator as discussed in the U.S. patent application Ser. No. 10/263,940 having incorporated by reference above. The circuit 37 coupled with the input increases the voltage of the received electrical energy and the circuit 37 coupled with the output increases the voltage of the electrical energy outputted from the circuit 37 coupled with the input.

In arrangements wherein circuitry 31 is coupled with signaling antenna 30, the outputted electrical energy from circuitry 31 having the increased voltage may be processed for example by processor 38 of communication circuitry 32 enabling processing of communications from device 12. In arrangements wherein circuitry 31 is coupled with power antenna 33, the outputted electrical energy having the increased voltage is utilized as operational energy within device 14 (e.g., power for communication circuitry 32 including processor 38).

As mentioned above, at least two and perhaps additional power conditioning circuits 39 may be coupled in series to provide individual ones of circuitry 31. For configurations wherein the power conditioning circuits 39 comprise voltage doubler circuits 37, the number of possible doublers which may be utilized is function of bandwidth reduction caused by the individual doublers, as well as available source current. Provision of circuitry 31 including two pairs of voltage doubler circuits (i.e., four voltage doubler circuits 37 in series) increases the output voltage by 12 dBv and reduces transmit power requirements by 6 dBm. Such enables the communications range to double if the receiving sensitivity of device 14, 14a is the limiting factor. The reduction in transmit power was verified by experimental measurements and the extension of the range calculation was verified by calculation.

As described herein, the power conditioning circuitry 31 may be utilized for passive and semi-passive device configurations. The power conditioning circuitry 31 may be used as an input signal amplifier and/or amplifying an RF beam signal for use in internal power sources or supplies of the devices 14, 14a.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed:

1. A wireless communication system comprising:
   a reader configured to output a first wireless communication signal and to receive a second wireless communication signal comprising a backscatter signal; and
   a remote communication device configured to receive the first wireless communication signal and to communicate the second wireless communication signal comprising the backscatter signal;
   wherein the remote communication device comprises:
      a signaling antenna configured to provide electrical energy;
      communication circuitry configured to process the received first wireless communication signal and to generate a modulation signal to communicate the backscatter signal;
      a plurality of first power conditioning circuits coupled in series intermediate the signaling antenna and the communication circuitry and individually configured to enhance at least one electrical characteristic of the electrical energy from the signaling antenna;
   wherein the remote communication device further comprises an energy source configured to provide operational energy to the communication circuitry using electromagnetic energy received within the remote communication device, and wherein the energy source comprises:
      a power antenna configured to provide the operational energy derived from the electromagnetic energy; and
      a plurality of second power conditioning circuits coupled in series and individually configured to enhance at least one electrical characteristic of the operational energy derived from the electromagnetic energy; and
   wherein the first and second power conditioning circuits individually comprise a voltage doubler circuit.

2. The system of claim 1 wherein the first and second power conditioning circuits are individually configured to increase a voltage of the electrical energy.

3. The system of claim 1 wherein the remote communication device comprises a radio frequency identification device.

4. The system of claim 1 wherein the signaling antenna is configured to provide the electrical energy corresponding to electromagnetic energy of the first wireless communication signal.

5. The system of claim 4 wherein the first wireless communication signal comprises data communicated by the reader.

6. The system of claim 1 further comprising a battery configured to provide operational energy to the communication circuitry.

7. The system of claim 1 wherein the reader is configured to output the first wireless communication signal using on/off key modulation.

8. The system of claim 1 wherein the modulation signal is configured to alter electrical characteristics of the signaling antenna to selectively reflect electromagnetic energy to communicate the backscatter signal.

9. A radio frequency identification device comprising:
   a signaling antenna configured to provide electrical energy corresponding to received electromagnetic energy comprising a first wireless communication signal from a reader;
   a power antenna separate from the signaling antenna and configured to provide operational energy separate from the electrical energy of the first wireless communication signal;
   a plurality of first voltage doubler circuits coupled in series and individually configured to increase a voltage of the electrical energy from the signaling antenna;
   communication circuitry coupled with the first voltage doubler circuits and configured to receive the electrical energy of the increased voltage from the first voltage doubler circuits and the operational energy from the power antenna;
   wherein the communication circuitry is configured to process the electrical energy of the increased voltage to process the first wireless communication signal;
   wherein the communication circuitry is configured to control the signaling antenna to backscatter modulate a second wireless communication signal for communication to the reader; and
   a plurality of second voltage doubler circuits coupled in series and further coupled with the power antenna and individually configured to increase a voltage of the operational energy.

10. The device of claim 9 wherein the signaling antenna is configured to provide electrical energy corresponding to the received electromagnetic energy comprising the first wireless communication signal communicated using on/off key modulation.

11. The device of claim 9 wherein the electromagnetic energy comprising the first wireless communication signal received by the signaling antenna comprises data communicated by the reader.

12. The device of claim 9 wherein the communication circuitry is only configured to process the electrical energy from the signaling antenna and is only configured to utilize operational energy received from the power antenna for power.

13. A wireless communication method comprising:
   providing a first device and a second device individually configured to communicate wireless communication signals;
   outputting a first wireless communication signal using the first device;
   first increasing an electrical characteristic of the first wireless communication signal using a first power conditioning circuit of the second device;
   second increasing the electrical characteristic of the first wireless communication signal using a second power conditioning circuit of the second device after the first increasing;
   processing the first wireless communication signal using the second device after the first and second increasings;
   backscatter modulating radio frequency energy using the second device responsive to the processing and to communicate a second wireless communication signal to the first device;
   receiving electromagnetic energy within the second device;
   providing electrical energy corresponding to the electromagnetic energy using the second device;
   third increasing an electrical characteristic of the electrical energy using a third power conditioning circuit of the second device;

fourth increasing the electrical characteristic of the electrical energy using a fourth power conditioning circuit of the second device after the third increasing to provide operational energy;

wherein the processing comprises processing using the operational energy; and wherein the first, second, third and fourth power conditioning circuits individually comprise a voltage doubler circuit.

14. The method of claim 13 wherein the first and second increasings individually comprise increasing the electrical characteristic comprising a voltage of the first wireless communication signal.

15. The method of claim 13 further comprising outputting a continuous wave signal using the first device, and wherein the backscatter modulating comprises backscatter modulating the continuous wave signal using the second device.

16. The method of claim 13 further comprising providing a battery configured to supply additional operational energy, and wherein the processing comprises processing using the additional operational energy.

17. The method of claim 13 wherein the first device comprises a reader and the second device comprises a radio frequency identification device.

18. The method of claim 13 wherein the outputting comprises outputting the first wireless communication signal using on/off key modulation.

19. The method of claim 13 wherein the processing comprises processing data of the first wireless communication signal.

20. The method of claim 13 wherein the processing comprises processing data of the first wireless communication signal having the increased electrical characteristic.

* * * * *

UNITED STATES PATENT AND TRADEMARK OFFICE
CERTIFICATE OF CORRECTION

PATENT NO. : 6,914,528 B2
DATED : July 5, 2005
INVENTOR(S) : Pratt et al.

It is certified that error appears in the above-identified patent and that said Letters Patent is hereby corrected as shown below:

<u>Column 7,</u>
Line 29, delete "$G_r$" before "=" and insert -- $G_t$ --.

<u>Column 8,</u>
Line 24, insert -- attorney docket no. 13154-B -- after "having".

Signed and Sealed this

Sixth Day of June, 2006

JON W. DUDAS
*Director of the United States Patent and Trademark Office*